United States Patent
Kleineberg et al.

(10) Patent No.: US 6,914,102 B2
(45) Date of Patent: Jul. 5, 2005

(54) THERMOREACTIVE HOT-MELT ADHESIVES

(75) Inventors: Olaf Kleineberg, Wuppertal (DE); Engin Temeltas, Wuppertal (DE); Heinz-Peter Pfeiffer, Wuppertal (DE)

(73) Assignee: E. I. du Pont de Nemours and Company, Wilmington, DE (US)

(*) Notice: Subject to any disclaimer, the term of this patent is extended or adjusted under 35 U.S.C. 154(b) by 42 days.

(21) Appl. No.: 10/719,075

(22) Filed: Nov. 21, 2003

(65) Prior Publication Data

US 2004/0167295 A1 Aug. 26, 2004

Related U.S. Application Data

(60) Provisional application No. 60/433,837, filed on Dec. 16, 2002.

(51) Int. Cl.$^7$ ................................................ C08G 18/06
(52) U.S. Cl. ................. 525/440; 525/457; 525/458; 428/425.1; 524/424; 524/430; 528/45; 528/61; 528/65; 528/66; 528/67
(58) Field of Search ................. 428/425.1; 528/45, 528/61, 66, 67; 525/440, 457, 458

(56) References Cited

U.S. PATENT DOCUMENTS 6,503,981 B2 * 1/2003 Hellwig et al. ............. 524/589
6,660,376 B1 * 12/2003 Zimmel et al. ......... 428/355 N

FOREIGN PATENT DOCUMENTS

| DE | 199 63 585 A1 | 7/2001 |
|---|---|---|
| EP | 419 928 A2 | 4/1991 |
| EP | 431 413 A2 | 6/1991 |
| EP | 455 500 B1 | 8/1995 |
| EP | 1 217 018 A1 | 6/2002 |
| JP | 62 181375 | 8/1987 |
| JP | 11 349913 | 12/1999 |

* cited by examiner

Primary Examiner—Robert E.L. Sellers
Assistant Examiner—Marc S. Zimmer
(74) Attorney, Agent, or Firm—Steven C. Benjamin

(57) ABSTRACT

A thermally curable hot-melt adhesive composition, comprising
  a polyurethane prepolymer having isocyanate groups, wherein at least 50% of the reactive isocyanate groups of the prepolymer are blocked, said prepolymer being the reaction product of
    (1) 20 to 40 wt % of at least one straight-chain amorphous polyester having a number average molecular mass Mn of 3000 to 6000 with
    (2) 40 to 60 wt % of at least one polyurethane elastomer,
    (3) 10 to 20 wt % of at least one polyester elastomer,
    (4) at least one diisocyanate,
    (5) at least one polyol as a chain extender, and
    (6) at least one blocking agent; and
  at least one isocyanate reactive component selected from the group consisting of polyalcohols, polyamines and hydroxy-functionalized epoxide resins;

wherein the percentages are based on the total weight of polyester, polyurethane elastomer and polyester elastomer.

13 Claims, No Drawings

THERMOREACTIVE HOT-MELT ADHESIVES

PRIORITY

This application claims priority from Provisional U.S. patent application Ser. No. 60/433,837 filed Dec. 16, 2002, incorporated herein by reference.

BACKGROUND OF THE INVENTION

The invention relates to thermoreactive hot-melt adhesives based on polyurethane.

Polyurethane adhesives (PUR-hot-melt adhesives) of prepolymers based on polyadipic acid derivatives or polyglycol derivatives and polyisocyanates are known, for example, from EP-B-455 400. These PUR-hot-melt adhesives are used for the bonding of synthetic materials, glass, metal, leather or wood and cure irreversibly, due to the effect of the humidity in the air or in the materials being adhered.

EP-A 0 431 413 describes a thermally curable PUR-powder based on polyurethane with encapsulated isocyanates, whereby the de-activation of the isocyanate groups is not brought about by capping, but by a blocking layer on the surface of the particle. Particulate materials are used as components in the formulation. In order to generate powder-shaped products, it is necessary to add the reaction mixture as a melt to an inert solvent/emulsifier system.

EP-A 419 928, DE-A 199 63 585 and EP-A 1 217 018 describe thermally curable PUR-adhesives comprising isocyanate group containing polymers in mixture with polyalkohols and polyamines. The incomplete heat stability of the cured adhesives for the use in the field of technical constructions is a disadvantage of these adhesives.

SUMMARY OF THE INVENTION

The invention provides a thermally curable hot-melt adhesive composition, comprising:
 a polyurethane prepolymer having isocyanate groups, wherein at least 50% of the reactive isocyanate groups of the prepolymer are blocked, said prepolymer being the reaction product of
  (1) 20 to 40 wt % of at least one straight-chain amorphous polyester having a number average molecular mass Mn of 3000 to 6000 with
  (2) 40 to 60 wt % of at least one polyurethane elastomer,
  (3) 10 to 20 wt % of at least one polyester elastomer,
  (4) at least one diisocyanate,
  (5) at least one polyol as a chain extender, and
  (6) at least one blocking agent; and
 at least one isocyanate reactive component selected from the group consisting of polyalcohols, polyamines and hydroxy-functionalized epoxide resins;
wherein the percentages are based on the total weight of polyester, polyurethane elastomer and polyester elastomer.

The hot-melt adhesive composition of this invention does not have the above-mentioned drawbacks of the aforementioned prior art compositions, but does have high heat stability after the adhesive is cured on the substrate. The adhesive is particularly suitable for technical constructions since the cured adhesive does not become brittle under low temperature conditions. Furthermore, the adhesive has good resistance to humidity and has an excellent storage life. This is particular advantageous when the parts to be joined together are precoated with the adhesive and then later, actually joined together.

DETAILED DESCRIPTION OF THE INVENTION

The hot-melt adhesive composition according to the invention is a one-component composition comprising the polyurethane prepolymer and the isocyanate reactive component.

The prepolymer contained in the hot-melt adhesive composition is based on straight-chain amorphous polyesters having a number average molecular mass Mn of 3000 to 6000, polyurethane elastomers and polyester elastomers in combination with blocked diisocyanates and polyols.

The polyesters are copolyesters having a glass transition temperature of, for example, 0 to 60° C. The polyesters are hydroxy-functional and have for example hydroxyl values from 20 to 30 mg KOH/g.

These polyesters can be obtained by reacting aliphatic, cycloaliphatic and/or aromatic dicarboxylic acids or the derivatives thereof, for example, adipic acid, cyclohexane dicarboxylic acid, sebacic acid, dodecanoic acid, phthalic acid, isophthalic acid, terephthalic acid and/or derivatives thereof, as well as diols. Examples of diols are diols having short chains, such as, ethylene glycol, diethylene glycol, triethylene glycol, propanediol-1,2 or propanediol-1,3, butanediol-1,2 or butanediol-1,4, neopentyl glycol, hexanediol-1,6, dipropylene glycol and tripropylene glycol. Particularly, solid amorphous copolyesters having a number average molecular mass in the range of 3000 to 6000 that are sold under the name DYNACOLL® are suitable for use.

The polyesters are usable in amounts of 20 to 40 wt %, preferably 25 to 35 wt %.

The polyesters suitable for use according to the invention can be prepared in conventional manner by transesterification of the acid component with the diol component, for example, under nitrogenous conditions, for example, at temperatures between 140 and 260° C., with or without using conventional transesterification catalysts.

The polyurethane elastomers according to the invention are semi-crystalline polyurethane elastomers with a softening point between, for example, 60 and 120° C. Examples of useful elastomers are reaction products of semi-crystalline polyesters and aliphatic isocyanates. Such products are sold under the name IROSTIC®. The polyurethane elastomers are usable in amounts of 40 to 60 wt %.

Polyethylene terephthalates, polybutylene terephthalates as well as modified polybutylene terephthalates can be used, for example, as polyester elastomers according to the invention. The polyester elastomers are compounds having a softening point of, for example, 190 to 260° C. These include, for example, modified polybutylene terephthalates under the name HYTREL®.

The polyester elastomers can be used in amounts of 10 to 20 wt %, preferably, 10 to 15 wt %.

Diisocyanates conventionally used in polyurethane chemistry can be used as the diisocyanates. These include, for example, hexamethylene diisocyanate, isophorone diisocyanate, 2,4-(2,6)-toluylene diisocyanate, dicyclohexyl diisocyanate, 4,4-diphenylmethane diisocyanate (MDI). Derivatives of MDI, such as isomers, homologs or prepolymers, such as, for example, Desmodur PF®, can also be used. 4,4-diphenylmethane diisocyanate is used in preference.

At least 50% of the reactive isocyanate groups of the polyurethane prepolymer are blocked. The free isocyanate groups that are not blocked react with the reactive component of the composition. Blocking of the isocyanates can be achieved by conventional means, for example, with butanone oxime, phenol, 4-hydroxybenzoic acid methylester, ethanoic acid ester, malonic acid ester, dimethyl pyrazole or caprolactame. While caprolactame is used in preference, combinations from several of the mentioned compounds are also possible.

The polyurethane prepolymer is furthermore prepared by also using polyols as chain extenders. Typically, diols are used having short chains and having a number average molecular mass Mn of, for example, 62 to 400, such as, ethylene glycol, diethylene glycol, triethylene glycol, propanediol-1,2 or propanediol-1,3, butanediol-1,2 or butanediol-1,4, neopentyl glycol, hexanediol-1,6, dipropylene glycol. Tripropylene glycol and derivatives of Bisphenol-A can also be used. Butanediol-1,4 and hexanediol-1,6 are used in preference.

The equivalent weight ratio of diol (polyester) to diisocyanate is preferably between 1:1 and 1:3. The polyester elastomer is not included in this weight ratio.

The isocyanate reactive component of the composition comprises one or more polyalcohols, such as, for example hexanediol-1,6, decanediol-1,10, dodecanediol-1,12 or ethoxylated Bisphenol-A or propoxylated Bisphenol-A. Propoxylated Bisphenol-A is used in preference.

Hydroxy-functionalized epoxy resins may also be used as reactive component, according to the invention, such as the reaction products of epichlorohydrin and Bisphenol A having an epoxy equivalent weight of e.g. 185 to 550. Typically, useful epoxy resins are sold under the name Epon® 828 and Epon® 1001.

The reactive component can also consist of one or more polyamines. Aliphatic, cycloaliphatic, araliphatic or aromatic polyamines, such as, for example, hexamethylene diamine, isophorone diamine, polyaminoamides may be used.

The mixing ratio of prepolymer and reactive component results from the total content of isocyanate (free and capped) and of the hydroxyl or amine content. The weight ratio of isocyanate to hydroxyl or amine in the composition is, for example, from 1:0.5 to 1:1.5, preferably 1:0.8 to 1:1.1.

The adhesive composition, according to the invention, can also contain additives, such as those conventionally used in polyurethane chemistry, for example, catalysts and accelerators, for example, bismuth compounds, dibutyl tin laurate or tertiary amines. Further examples are light protecting agents, antioxidants and fillers such as barium sulfate, pyrogenous silicic acid, ground minerals or talcum as well as pigments for e.g. coloring the adhesive for specific applications, and metallic powder and/or metallic chips.

The adhesive composition, according to the invention, can be prepared in a conventional stirring vessel, preferably in conventional kneading devices under heat influence, e.g. in a temperature range between 160 and 250° C., if necessary, under prior melting of the components. The adhesive, according to the invention, results after cooling the reaction mixture.

The adhesive, according to the invention, can be applied as a melt on one side or on the two sides of the pieces to be adhered. For this purpose, the melting or the pasting and curing of the adhesive can, for example, be carried out by infrared radiation under the use of emitter temperatures between 1200 and 2900° C., preferably 2600° C. To reduce the heating period, black pigments can be added to the adhesive composition, such as, iron oxide, carbon black, graphite or black dyes. Depending on the intended use the amount of such pigments may be 0.05 to 2.50 wt %, relating to the adhesive composition.

The melting and curing of the adhesive may also be carried out by hot air or microwave radiation or with high frequencies.

Due to the storage stability of the adhesive in air, the adhesive is suitable for pre-coating the pieces to produce, for example, pre-coated fixing elements. It is possible to combine the application process of the adhesive with the manufacture of the pieces, for example, by applying the adhesive directly after manufacturing the pieces.

The pre-coated pieces can be stored and can be adhered with the desired parts later on, for example, in an automotive finishing process.

At the time that the adhesion of the pre-coated pieces is desired, the adhesive is melted by heating, for example, at a temperature in the range from 140 to 300° C., preferably from 170 to 250° C. During this time, the blocked isocyanate groups in the composition are set free and react with the reactive component in the adhesive and increase the molecular weight, and this effects the adhesion process. After cooling of the adhesive, the pieces are securely adhered to one another and the adhesive can no longer be melted.

The adhesive, according to the invention, can also be brought to reaction by temperature increase to paste and cure, without any intermediate storage of the parts that are coated with the adhesive, i.e., directly after the application of the adhesive.

The cross-linking reaction accompanying the melting or the pasting and curing of the adhesive takes place rapidly, such that, after a time period of a few seconds, for example, 4 to 6 seconds, up to 20 to 30 seconds, depending on the type of melting, extensive curing of the adhesive agent takes place.

The adhesive composition, according to the invention, can be used to paste most diverse materials together or with each other. These can, for example, be materials of metal, plastics, glass, wood, leather and textile materials. The pieces may be composed of plastics, such as, polyolefin, polystyrene, polyamide, polyester, plasticized polyester, copolymers of acrylonitrile, of styrene, of butadiene, and mixtures thereof. They can also be composed of metal, such as, aluminum or steel. The steel surface can be phosphated, copper-sheathed, tin-plated, galvanized or coated with organic coatings. The pieces can be, for example, pins or notches or other dimensioned substrates composed of the mentioned materials.

The adhesive composition, according to the invention, makes it possible to obtain a high heat stability after curing the adhesive on the substrate, particularly suitable for technical constructions, without embrittlement of the adhesive bond by low temperatures. Due to the adhesive composition's resistance to water and humidity, a premature cross-linking reaction, and thus a premature curing of the adhesive, does not take place in spite of an extended storage period. Furthermore, foaming of the adhesive by the generation of carbon dioxide by a reaction with water does not occur and thus a change of position or a partial separation of the pasted parts does not take place.

The invention will be explained by means of the following Examples.

EXAMPLES

Example 1

Preparation of a Pre-Product 400 g DYNACOLL® 7140 (solid amorphous copolyester having a number average molecular mass of approximately 5500, a glass transition temperature of 40° C. and a hydroxyl value from 18 to 24 mg KOH/g) and 400 g HYTREL® 7264 (polybutylene terephthalate) are melted together with 1.6 g triphenylphosphite (Irgafoss TPP) in a kneading device having an extruder screw. After cooling down the mixture to a temperature of 220° C. 800 g elastomer 508 is added. The mixture is stirred until a homogeneous mixture is obtained. Thereafter cooling takes place, and an elastic solid mass having a softening point between 190 and 210° C. is resulting.

Example 2
Preparation of a Hot-Melt Adhesive Composition According the Invention 600 g elastic mass of Example 1 and 200 g IROSTIC® 6559 (reaction product of a semi-crystalline polyester and an aliphatic isocyanate) are homogeneously melted at 200° C. in the above mentioned kneading device. 200 g DYNYCOLL® 7140 and 34 g hexanediol are added. The mixture is stirred at a temperature between 160 and 180° C. for 30 minutes. 125 g 4,4-diphenylmethan diisocyanate is added and after stirring for 1 hour 44 g caprolactam is added to the mixture. After stirring for 1 hour and after adding 80 g propoxylated Bisphenol-A and 2 g graphite having a particle size in the range of less than 3 micron (relating to 40 to 60% of the graphite particles) the mixture is stirred for 30 minutes. A storage stable hot-melt adhesive results.

Example 3
Testing of the Hot-Melt Adhesive

A layer of 0.6 mm of the resulted hot-melt adhesive is uniformly applied to a piece of a black colored polybutylene terephthalate having a pasting area of 2 square centimeters. Pre-coated pieces result that are stable in ambient temperature air and under normal humidity conditions. The pre-coated pieces may be activated by IR radiation within 6 to 12 seconds and may be pasted on substrates such as coated or uncoated sheet. On sheet coated by cathodic electrodipping, the adhesive strength of the pasted pieces are as follows: (Tensile strength test was conducted under different temperatures)

−20° C.: 12
20° C.: 14
80° C.: 6

These results demonstrate the high heat stability after curing the adhesive on the substrate without any embrittlement of the pasting under the influence of low temperatures.

We claim:

1. A thermally curable hot-melt adhesive composition, comprising
    a polyurethane prepolymer having isocyanate groups, wherein at least 50% of the reactive isocyanate groups of the prepolymer are blocked, said prepolymer being the reaction product of
        (1) 20 to 40 wt % of at least one straight-chain amorphous polyester having a number average molecular mass Mn of 3000 to 6000 with
        (2) 40 to 60 wt % of at least one polyurethane elastomer,
        (3) 10 to 20 wt % of at least one polyester elastomer,
        (4) at least one diisocyanate,
        (5) at least one polyol as a chain extender, and
        (6) at least one blocking agent; and
    at least one isocyanate reactive component selected from the group consisting of polyalcohols, polyamines and hydroxy-functionalized epoxide resins;
    wherein the percentages are based on the total weight of polyester, polyurethane elastomer and polyester elastomer.

2. The adhesive of claim 1 wherein the prepolymer having isocyanate group is obtained from a reaction mixture comprising
    (1) 25 to 35 wt % of at least one straight-chain amorphous polyester having a number average molecular mass Mn of 3000 to 6000 with
    (2) 40 to 60 wt % of at least one polyurethane elastomer,
    (3) 10 to 15 wt % of at least one polyester elastomer,
    (4) at least one diisocyanate,
    (5) at least one polyol as a chain extender, and
    (6) at least one blocking agent;
    wherein the percentages are based on the total weight of polyester, polyurethane elastomer and polyester elastomer.

3. The adhesive of claim 1 wherein the straight-chain amorphous polyesters are obtained by reacting an acid component selected from the group consisting of aliphatic, cycloaliphatic aromatic dicarboxylic acids, the derivatives thereof and any mixtures thereof, with diols having short chains.

4. The adhesive of claim 1 wherein the polyesters are straight-chain amorphous copolyesters having a glass transition temperature of 0 to 60° C.

5. The adhesive of claim 1 wherein the polyurethane elastomers is a semi-crystalline polyurethane elastomer with a softening point between 60 to 120° C.

6. The adhesive of claim 1 wherein the polyester elastomer has a softening point of 190 to 260° C.

7. The adhesive of claim 6 wherein the polyester elastomer is selected from the group consisting of polyethylene terephthalates, polybutylene terephthalates and modified polybutylene terephthalates.

8. The adhesive of claim 1 wherein the isocyanate reactive component is selected from the group consisting of hexanediol-1,6, decanediol-1,10, dodecanediol-1,12, ethoxylated Bisphenol-A, propoxylated Bisphenol-A, hydroxy functional epoxy resins based on epichlorohydrin and Bisphenol A having an epoxy equivalent weight of 185 to 550, hexamethylene diamine, isophorone diamine and polyaminoamides.

9. The adhesive of claim 1 wherein the weight ratio of isocyanate to hydroxyl or amine is from 1:0.5 to 1:1.5.

10. The adhesive of claim 1 comprising black pigments selected from the group consisting of iron oxide, carbon black, graphite and black dyes in an amount of 0.05 to 2.5 wt %.

11. Coated pieces wherein the pieces are pre-coated with the adhesive of claim 1.

12. A process for coating pieces comprising applying the adhesive of claim 1 directly after the manufacture of the piece.

13. A process for pasting pieces together which comprises applying an adhesive layer of the adhesive composition of claim 1 to a first piece and bringing a second piece into contact with the adhesive layer of said first piece.

* * * * *